US012646328B2

(12) United States Patent
Lapolla et al.

(10) Patent No.: US 12,646,328 B2
(45) Date of Patent: Jun. 2, 2026

(54) PARKING FACILITY SYSTEM FOR VEHICLE DETECTION AND IDENTIFICATION

(71) Applicant: AirGarage, Inc., San Francisco, CA (US)

(72) Inventors: Josiah Kendell Lapolla, Falls Church, VA (US); Anusha Datar, San Francisco, CA (US); Scott Elliot Fitsimones, San Francisco, CA (US); Jonathon Andrew Barkl, San Francisco, CA (US); Chelsea Lynn Border, San Francisco, CA (US)

(73) Assignee: AirGarage, Inc., San Francisco, CA (US)

( * ) Notice: Subject to any disclaimer, the term of this patent is extended or adjusted under 35 U.S.C. 154(b) by 0 days.

(21) Appl. No.: 19/009,692

(22) Filed: Jan. 3, 2025

(65) Prior Publication Data

US 2025/0218183 A1     Jul. 3, 2025

Related U.S. Application Data

(63) Continuation of application No. 18/598,137, filed on Mar. 7, 2024, now Pat. No. 12,198,437.

(60) Provisional application No. 63/616,419, filed on Dec. 29, 2023.

(51) Int. Cl.
| | |
|---|---|
| *G06V 20/52* | (2022.01) |
| *G06V 20/62* | (2022.01) |
| *G08G 1/052* | (2006.01) |
| *G08G 1/14* | (2006.01) |

(52) U.S. Cl.
CPC ............ *G06V 20/52* (2022.01); *G06V 20/625* (2022.01); *G08G 1/052* (2013.01); *G08G 1/148* (2013.01); *G06V 2201/08* (2022.01)

(58) Field of Classification Search
CPC .. G06V 20/52; G06V 20/625; G06V 2201/08; G08G 1/052; G08G 1/148
See application file for complete search history.

(56) References Cited

U.S. PATENT DOCUMENTS

| | | | |
|---|---|---|---|
| 2002/0109610 A1 | 8/2002 | Katz | |
| 2003/0132840 A1 | 7/2003 | Bahar | |
| 2007/0257818 A1 | 11/2007 | Aubrey et al. | |
| 2010/0309024 A1* | 12/2010 | Mimeault | G08G 1/04 |
| | | | 340/932.2 |
| 2013/0275080 A1* | 10/2013 | Wang | G01P 3/68 |
| | | | 702/149 |
| 2013/0300542 A1 | 11/2013 | Hansen | |
| 2018/0247534 A1* | 8/2018 | Williams | G08G 1/065 |
| 2019/0329768 A1 | 10/2019 | Shalev-Shwartz et al. | |

(Continued)

FOREIGN PATENT DOCUMENTS

DE      102012224243 A1      6/2014

*Primary Examiner* — Amara Abdi
(74) *Attorney, Agent, or Firm* — Cognition IP, P.C.; Edward Steakley; Schiller Hill

(57) ABSTRACT

Systems, tools and methods to allow for control and management of a free flowing parking facility. Accurate recognition of vehicles may be achieved by identifying a target time and location for capturing an image of the vehicle based on a predicted path of the vehicle. The predicted path may be calculated based on sensor readings that detect the presence of a vehicle as well as the speed at which it is traveling.

24 Claims, 7 Drawing Sheets

300

301

(56)  References Cited

U.S. PATENT DOCUMENTS

| | | | |
|---|---|---|---|
| 2020/0134332 A1 | 4/2020 | Vossoughi et al. | |
| 2020/0309972 A1 | 10/2020 | Price | |
| 2021/0132227 A1* | 5/2021 | Aboalshamat | ........... G07C 9/00 |
| 2021/0134148 A1 | 5/2021 | Aboalshamat | |
| 2021/0287032 A1* | 9/2021 | Guibene | ................ G06V 20/52 |
| 2021/0398421 A1* | 12/2021 | Nishimura | ........... G08G 1/0175 |
| 2022/0381579 A1 | 12/2022 | White | |
| 2023/0082134 A1* | 3/2023 | Martin | ................. G06V 20/625 |
| | | | 382/103 |
| 2023/0125264 A1 | 4/2023 | Parameswaran et al. | |

* cited by examiner

100

400

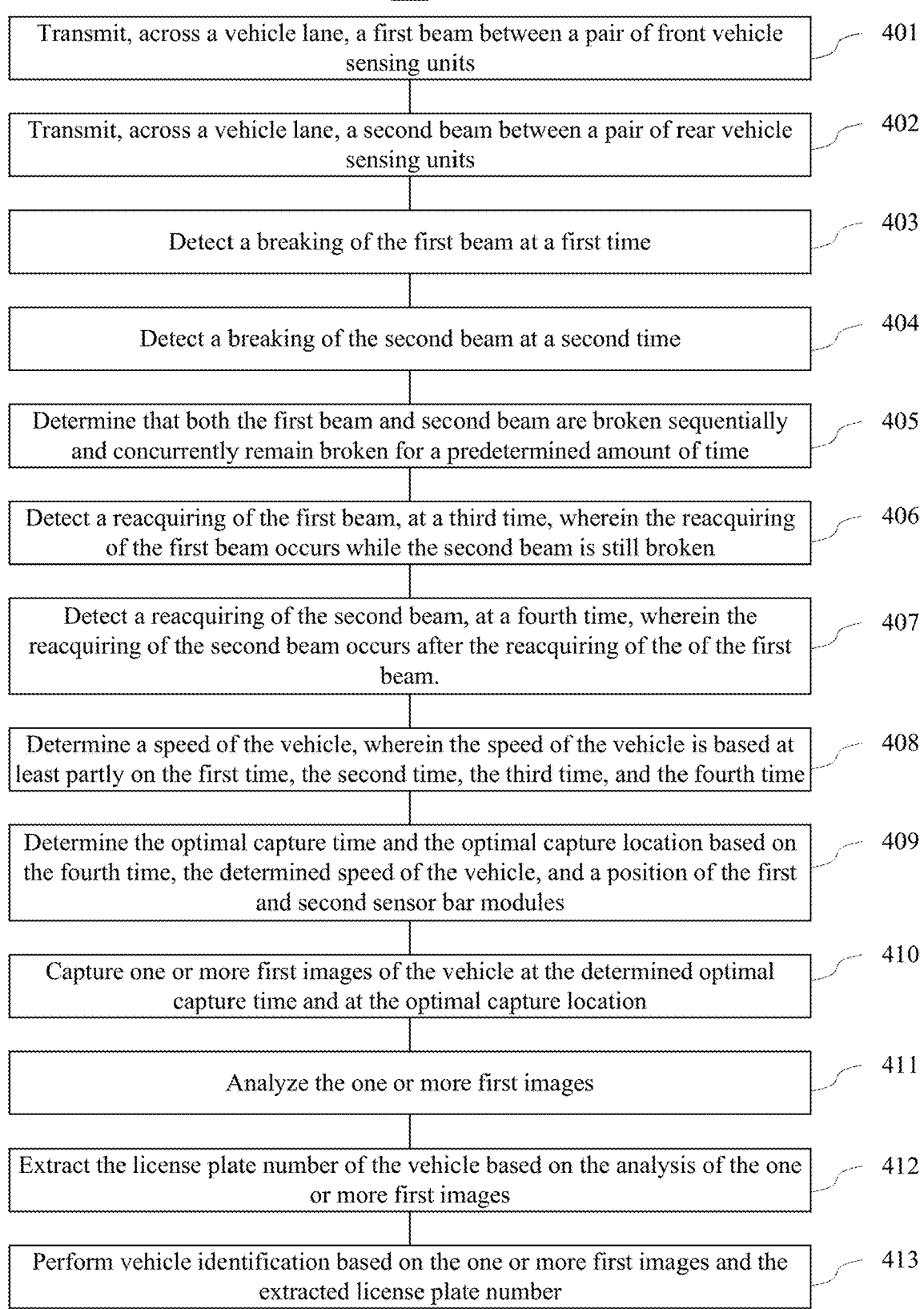

Transmit, across a vehicle lane, a first beam between a pair of front vehicle sensing units — 401

Transmit, across a vehicle lane, a second beam between a pair of rear vehicle sensing units — 402

Detect a breaking of the first beam at a first time — 403

Detect a breaking of the second beam at a second time — 404

Determine that both the first beam and second beam are broken sequentially and concurrently remain broken for a predetermined amount of time — 405

Detect a reacquiring of the first beam, at a third time, wherein the reacquiring of the first beam occurs while the second beam is still broken — 406

Detect a reacquiring of the second beam, at a fourth time, wherein the reacquiring of the second beam occurs after the reacquiring of the of the first beam. — 407

Determine a speed of the vehicle, wherein the speed of the vehicle is based at least partly on the first time, the second time, the third time, and the fourth time — 408

Determine the optimal capture time and the optimal capture location based on the fourth time, the determined speed of the vehicle, and a position of the first and second sensor bar modules — 409

Capture one or more first images of the vehicle at the determined optimal capture time and at the optimal capture location — 410

Analyze the one or more first images — 411

Extract the license plate number of the vehicle based on the analysis of the one or more first images — 412

Perform vehicle identification based on the one or more first images and the extracted license plate number — 413

FIG. 4

PARKING FACILITY SYSTEM FOR VEHICLE DETECTION AND IDENTIFICATION

CROSS-REFERENCE TO RELATED APPLICATIONS

This application is a continuation of U.S. patent application Ser. No. 18/598,137, filed on Mar. 7, 2024, which claims the benefit of priority of U.S. Provisional Application No. 63/616,419, filed on Dec. 29, 2023, which are hereby incorporated by reference in their entirety.

FIELD

The present invention relates generally to systems, tools and methods to identify vehicles entering and exiting a parking facility.

BACKGROUND

Control and management of entry and exit points of a parking facility are traditionally performed by parking attendants. Recent developments in automated control of entry and exit act as simple counters that issue tickets to and receive tickets from vehicle operators. The traditional systems may only be able to detect simple binary signals, such as those produced by motion detectors or underground induction loops.

SUMMARY

The system and methods described herein provide for detecting a vehicle entering or exiting a parking facility, wherein the vehicle detection system may comprise a server, a datastore and a vehicle detection unit. The vehicle detection unit may comprise a processing module, comprising one or more processors, one or more sensor bar modules, wherein each of the one or more sensor bar modules may comprise one or more vehicle sensing units, one or more power supply modules and one or more camera modules. The one or more camera modules may be configured to capture one or more images of a vehicle at a target capture time and at a target capture location on a vehicle lane.

In some embodiments, the one or more sensor bar modules may comprise a first sensor bar module and a second sensor bar module, wherein the first sensor bar module may be positioned on a first side of the vehicle lane and the second sensor bar module may be positioned on a second side of the vehicle lane. The first sensor bar module and the second sensor bar module may be aligned with one another.

In some embodiments, the first sensor bar module may comprise a first front vehicle sensing unit and a first rear vehicle sensing unit. The second sensor bar module may comprise a second front vehicle sensing unit and a second rear vehicle sensing unit. The second front vehicle sensing unit may be configured to transmit, across the vehicle lane, a first beam to the first front vehicle sensing unit and the second rear vehicle sensing unit may be configured to transmit, across the vehicle lane, a second beam to the first rear vehicle sensing unit.

In some embodiments, the vehicle detection unit may further be configured to determine that the vehicle has entered or exited the parking facility. The determining may comprise detecting a breaking of the first beam at a first time, detecting a breaking of the second beam at a second time, determining that both the first beam and second beam are broken sequentially and concurrently remain broken for a predetermined amount of time, detecting a reacquiring of the first beam, at a third time, wherein the reacquiring of the first beam occurs while the second beam is still broken and detecting a reacquiring of the second beam, at a fourth time, wherein the reacquiring of the second beam occurs after the reacquiring of the of the first beam. The vehicle detection unit may further be configured to identify the vehicle, wherein the identifying the vehicle may comprise determining a speed of the vehicle. The speed of the vehicle may be based at least partly on the first time, the second time, the third time, and the fourth time. The detection unit may further determine the target capture time and the target capture location based on the fourth time, the determined speed of the vehicle, and a position of the first and second sensor bar modules. One or more first images of the vehicle may then be captured at the determined target capture time and at the target capture location. The one or more first images may then be analyzed and a license plate number of the vehicle may be extracted based on analysis of the one or more first images. The extracted license plate number may then be transmitted to a server for further analysis and vehicle recognition. In some embodiments, the analysis may be used to identify and extract additional identifying vehicle information. The additional identifying vehicle information may also be transmitted to the server. The additional identifying vehicle information may then be used by the server in the further analysis and vehicle recognition.

In some embodiments, the one or more first images may be transmitted to the server for analysis, and the license plate and other identifying vehicle information may be extracted during said analysis. The server may further use the extracted license plate number and other identifying vehicle information, and in some cases also using the one or more first images, to perform vehicle recognition and determination of other characteristics of the vehicle, the parking facility and/or the environment state.

The appended claims may also serve as a summary of this application.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 4 is a flow chart illustrating an exemplary method that may be performed in accordance with some embodiments.

DETAILED DESCRIPTION

Figure 1:
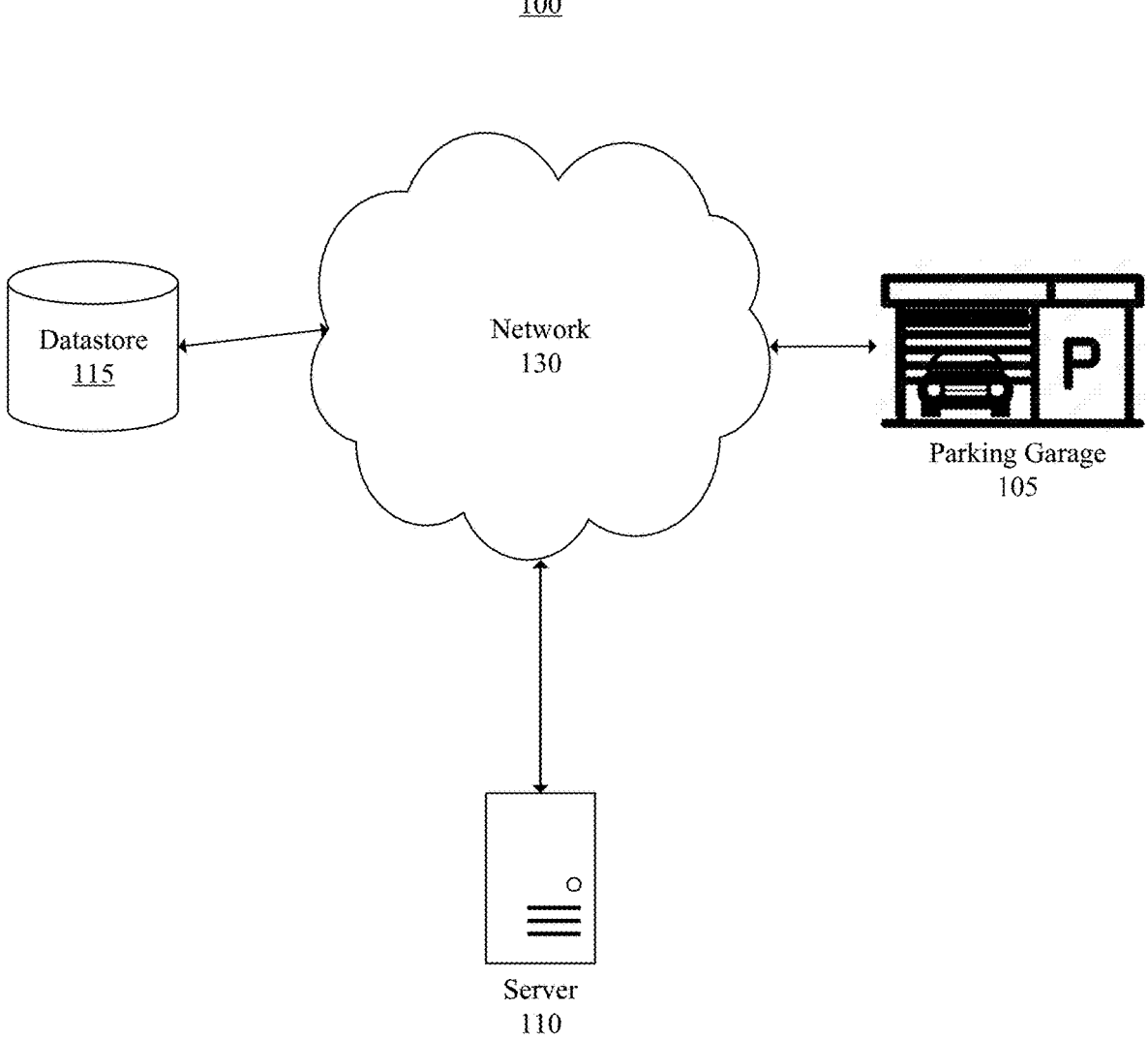
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system, platform and methods for detecting a vehicle entering or exiting a parking facility and the identification of the vehicle.

In some embodiments, the system may be configured to control free flowing traffic that is entering and exiting a parking facility. The system may use one or more sensors to determine whether a vehicle has entered or exited the parking facility. Based on one or more signals from the one or more sensors, the system may calculate a time of entry/exit, a speed (velocity) of the vehicle, a length of the vehicle and/or the type of vehicle. In some embodiments, the system may be configured to calculate an entry speed of the vehicle, an exit speed of the vehicle, an average speed of the vehicle and an acceleration of the vehicle. The system may also calculate/predict the vehicle's position through time (path), as it enters or exits the parking facility, based on the vehicle's time of entry, speed, acceleration, length and type of vehicle. By knowing where the vehicle will be at any given time, the system may be able to more accurately identify the vehicle. The system may allow for the decoupling of vehicle recognition from a fixed location in space.

In some embodiments, the vehicle's entry speed/velocity, exit speed/velocity and acceleration may be used by the system to calculate or otherwise predict the speed/velocity and location of the vehicle at future times. The system may also use other environmental characteristics in the future speed and location predictions/calculations, such the lane route, obstructions, speed bumps, sharp turns/corners, elevation changes, traffic within the parking facility, position of parking spots, occupancy in said parking spots, direction of flow of traffic, width of the lanes or combination thereof. These predicted speeds may be for a plurality of locations within the parking facility. The predicted speeds for future points along the lane route may be used in the path calculation/prediction to provide a more accurate estimation of the vehicle's location at any given time.

In some embodiments, the system may be configured to capture images of the vehicle without the need to calculate a length or speed of a vehicle. The capturing of images may be controlled based on a calculated or calibrated time offset from a sensor detection event, such as a beam break ending event.

In some embodiments, one or more cameras may be positions within the parking facility at known locations and orientations. The one or more cameras may be configured to continually capture image frames and to transmit captured image frames to the system for analysis and/or to be stored.

In some embodiments, the system may be configured to determine a target capture time and location to capture images of the vehicle. The target time may be based on a known viewing frustum of the one or more cameras and a predicted path of the vehicle through the viewing frustum. In some embodiments, the target time may also be based, at least partially, on the target location of the vehicle. The target location may be a location within the camera's viewing frustum that is determined to provide the best view of the vehicles license plate. Determination of the target location may be based at least in part on the predicted path of the vehicle and/or physical characteristics of the vehicle, such as length or type.

In some embodiments, the system may choose to keep a subset of the captured image frames around the target capture time while discarding the rest. In some embodiments, the cameras may be configured to capture images at a predetermined sampling rate. In some embodiments, the system may instruct the cameras to capture image frames at a higher sampling rate for a period of time around the target capture time. For example, a camera may be configured to capture images at the rate of one per second as the default/predetermined sampling rate. When a vehicle enters the parking facility, the system may then predict the path of the vehicle, the target capture location and the target capture time. The system may then instruct the camera to capture images at an increased sampling rate, such as 90 frames per second, for a set period, such as 5 seconds, before and after the target capture time. The increased sampling rate and the set period may be dynamically set for each vehicle.

In some embodiments, the frame rate of the cameras and the sampling rates may be two different rates. The camera frame rates may correspond to the capture of a plurality of image frames at a set predetermined rate and at a predetermined resolution, while the sampling rate may correspond to a rate at which the system retrieves, stores, or analyzes frames of the plurality of image frames captured by the camera. For example, the system may use a camera that is configured to capture images at 4 K resolution and 90 frames per second. The system may then perform a sampling of the captured frames at a rate that is a subset of the camera capture rate, such as 1 frame per second. The system may perform operations on individual frames from the plurality of captured frames at set sampling intervals corresponding to the sampling rate.

In some embodiments, the system may perform analysis of the subset of captured images to determine a best image for identifying the vehicle. A vehicle recognition module may be configured to use the best image to identify and read the license plate number of the vehicle. The vehicle recognition module may use the license plate number to match the vehicle to a registered vehicle account. The registered vehicle account may include driver/user information, payment information, parking history and vehicle data, such as license plate number, color, make, model and type. If the vehicle recognition module is unable to match the vehicle to a registered vehicle account, a new vehicle account may be generated for the vehicle. The recognition module may also use the best image to recognize the make, model and/or type and store the recognized information in the new vehicle account. In some embodiments, the vehicle recognition module may use one or more of the subset of captured images to perform the vehicle recognition processes (i.e., license plate, make, model, type). In some embodiments, the vehicle recognition module may be a module run locally on the system. In some embodiments, the vehicle recognition module may be run on a server. The server may be local or remote and the subset of captured images may be sent to the server for analysis and vehicle recognition.

In some embodiments, a parking session may be started for each vehicle entering the parking facility. A parking session record may be generated for each parking session, at least partially based on the vehicle recognition and an entry event. The entry event may comprise a timestamp of entry into the parking facility. The entry event may further comprise information corresponding to the detection and prediction of the vehicle's path upon entry as well as one or more captured images of the vehicle as it entered the facility.

Vehicle recognition may also be performed for each vehicle exiting the facility. The exiting vehicle may be matched to an active parking session and an exit event may be generated in the same manner as the entry event. The duration of parking may be determined based on the entry event time stamp and the exit event timestamp.

The system may further be configured to receive payment for a parking session. The parking session may be an active parking session or a previous parking session. In some embodiments, the driver/user may receive, on a mobile device, a prompt or notification requesting payment for the parking session.

In some embodiments, active parking sessions in which a payment has not been received within a predetermined amount of time may be flagged/identified as a possible parking violation. Flagged parking sessions may be reported to a parking enforcement officer for enforcement.

In some embodiments, when a parking session has an exit event without an entry event, the system may be configured to retrieve a sampling of entry images for a predetermined period before the timestamp of the exit event. The sampling of images may then be analyzed to determine if a vehicle is present in the image, and if there is a vehicle in the image, the vehicle recognition module may then proceed to determine if the entering vehicle in the image matches the vehicle associated with the parking session with a missing entry event. If a match is made, an entry event may be created for the parking session and stored.

In some embodiments, the system may be configured to perform a health check process and anomaly detection. The system may poll sensors and devices at predetermined intervals to verify that they are operating correctly. Unusual sensor readings and unresponsive sensors may trigger an alert. The alert may be used to indicate that a sensor or module of the system has been damaged, unreachable or not operating as intended. A maintenance technician may then be dispatched to investigate and/or repair the identified issue.

In some embodiments, the system may be configured to identify a malfunction or anomaly in the one or more sensor bars used to detect vehicle entry and exit. In the absence of sensor information, the system may switch to a vision-only vehicle detection and recognition process. In the vision-only process, the system may increase the sampling rate of image capture of the one or more cameras and perform a vehicle detection process for each of the sampled images. Vehicle recognition may be performed for each of the sampled images identified as having a vehicle. Parking sessions may then be generated for each of the recognized vehicles, with entry timestamp and exit timestamp being based on the timestamp of the image and not information from the sensor bar.

The system may be configured to change identification procedures based on the state of the one or more sensor bars and the one or more cameras. For example, in a normally functioning system with two sensor pairs split between two sensor bars, the system may be configured to determine a timestamp and duration of a vehicle detection for each of the sensor pairs. The timestamp and duration of detection for each of the sensor pairs may be used to calculate the speed of the vehicle and other identifying characteristics of the vehicle, such as length. The system may then use the calculated speed of the vehicle to control the capture of images by the camera. The timeframe that the capture is to be performed may be based on a prediction of the location of the vehicle based on the speed of the vehicle, the path of the vehicle, the position/orientation of the camera, the camera frustum and the position of the vehicle in the captured image frames. The captured images may then be analyzed.

When a single sensor pair is functioning normally, and the other sensor pair is unresponsive, faulty, malfunctioning or providing inaccurate information, the system may switch to a second operational mode. The second operational mode may use information from the functional sensor pair to estimate the timeframe that the capture is to be performed. This timeframe may be increased to compensate for the reduced amount of information available to the system. The speed may be estimated based on the duration of detection at the functional sensor pair. Without being able to calculate a length of the vehicle or the true speed of the vehicle, the system may calculate the speed of the vehicle based on an estimated length of the vehicle. In some embodiments, the system may calculate more than one possible speed for the vehicle based on known vehicle lengths. For example, the system may determine a speed based on the average or median length of vehicles that have entered the parking facility in the past or an average or median length of all vehicles models. The system may also calculate a speed based on the smallest vehicle length, a speed based on an average/median length and a speed based on the longest vehicle length. These three speeds may be used to calculate the starting and ending capture times for the camera as well as the predicted location of the vehicle at those times and the expected position of the vehicle in the captured image frames. The speed calculated based on the longest vehicle length may be the highest speed and therefore would pass through the camera frustum at a first vehicle time. The speed calculated for the shortest vehicle length may be the lowest speed and therefore would pass through the camera frustum at a second vehicle time. The speed calculated based on the average/median vehicle length would therefore be between the highest and lowest speed and the average vehicle time would be between the first vehicle time and the second vehicle time. In some embodiments, the system may determine the starting capture time based on the first vehicle time, the corresponding vehicle speed and the predicted position of the longest length vehicle in the image frames with respect to time. The system may also determine the ending capture time based on the second vehicle time, the corresponding vehicle speed and the predicted position of the shortest length vehicle in the image frames with respect to time. The system may be configured to identify a target capture time based on the calculated speed of the average/median length vehicle and the predicted position of the average/median length vehicle in the image frames with respect to time. The camera may capture a plurality of image frames from the starting capture time to the ending capture time and transmit the plurality of images to the server for analysis. The system may also send information corresponding to the predictions and calculations performed with respect to each of the longest length vehicle, the average/median length vehicle and the shortest length vehicle. This information may be used to optimize the analysis of the captured images and aid in the identification of vehicle information from the images. When only a single sensor pair is functioning, the system may maintain accurate functionality by adjusting the way in which the image capture is performed, such as increasing the duration of the image capture and adjusting the timing of the image capture to accommodate any length of vehicle entering the facility.

When all sensor pairs are in a faulty state or otherwise malfunctioning, the system may be configured to switch to a third operational mode. The third operational mode may be a camera only mode. The third operational mode may be similar to or the same as that described above with regard to the vision-only vehicle detection and recognition process used in the absence of sensor information.

In some embodiments, the system may be configured to include additional sensor bars and cameras within the parking facility to facilitate tracking of vehicles already within the facility. The methods, processes and systems used in the entry and exit of vehicles from the facility may also be used in the tracking and monitoring of vehicles operating within the facility. The system may be configured to actively manage vehicles within the facility based on the tracking and monitoring. For example, the system may be configured to maintain a list of vehicles that have entered and exited the facility, as well as a list of vehicles that are currently within the facility. The additional sensor bars and cameras may be used to keep track of the position of some or all of the vehicles in the facility. The tracking may include information related to the state of the vehicle, such as parked or moving, the location of the vehicle, such as the parking position for a parked vehicle or the floor/position of for a vehicle that is entering or exiting the facility. The system may be configured to provide information to entering vehicles, such as location of open parking spots, number of open parking spots and/or location of elevators/stairwells. The system may identify vehicles that intend to exit the facility based on the duration that the vehicle has been within the facility and/or the vehicle previously being detected as a parked vehicle by the system. Exiting vehicles may be provided with information related to the location of facility exits and routes to reach said exits. In some embodiments, the system may manage the vehicles not currently parked in the facility by providing vehicles with warnings and notifications based on the position, speed, route and/or intent (entry/exit) of other vehicles in the facility as well as environmental conditions and the state of the facility itself.

FIG. 1 is a diagram illustrating an exemplary vehicle detection and identification system 100 in which some embodiments may operate. The vehicle detection and identification system 100 may comprise one or more parking facilities 105, one or more servers 110, one or more datastores 115 and one or more networks 130.

The one or more parking facilities 105 may include parking lots, underground parking facilities, multistory parking facilities or any other parking facilities. The parking facility 105 may be connected to server 110 and datastore 115 over network 130.

Server 110 may be one or more physical or virtual machines configured to communicate with the one or more parking facilities 105 and the one or more datastores 115. The one or more servers 110 may be configured as a distributed computing infrastructure and processing of applications and other software may be carried out on the cloud.

Datastores 115 may communicate with one another over network 130. Datastores 115 may be any storage device capable of storing data for processing or as a result of processing information at the parking facilities 105 and/or servers 110. The datastores 115 may be a separate device or the same device as server 110. The datastores 115 may be located in the same location as that of server 110, or at separate locations.

Network 130 may be an intranet, internet, mesh, 3G, 4G, 5G, LTE, GSM, peer-to-peer or other communication network that allows the one or more servers 110 to communicate with the one or more parking facilities 105 and datastores 115. Any wireless or wired communication protocol or technology may be used as network 130.

Figure 2A:
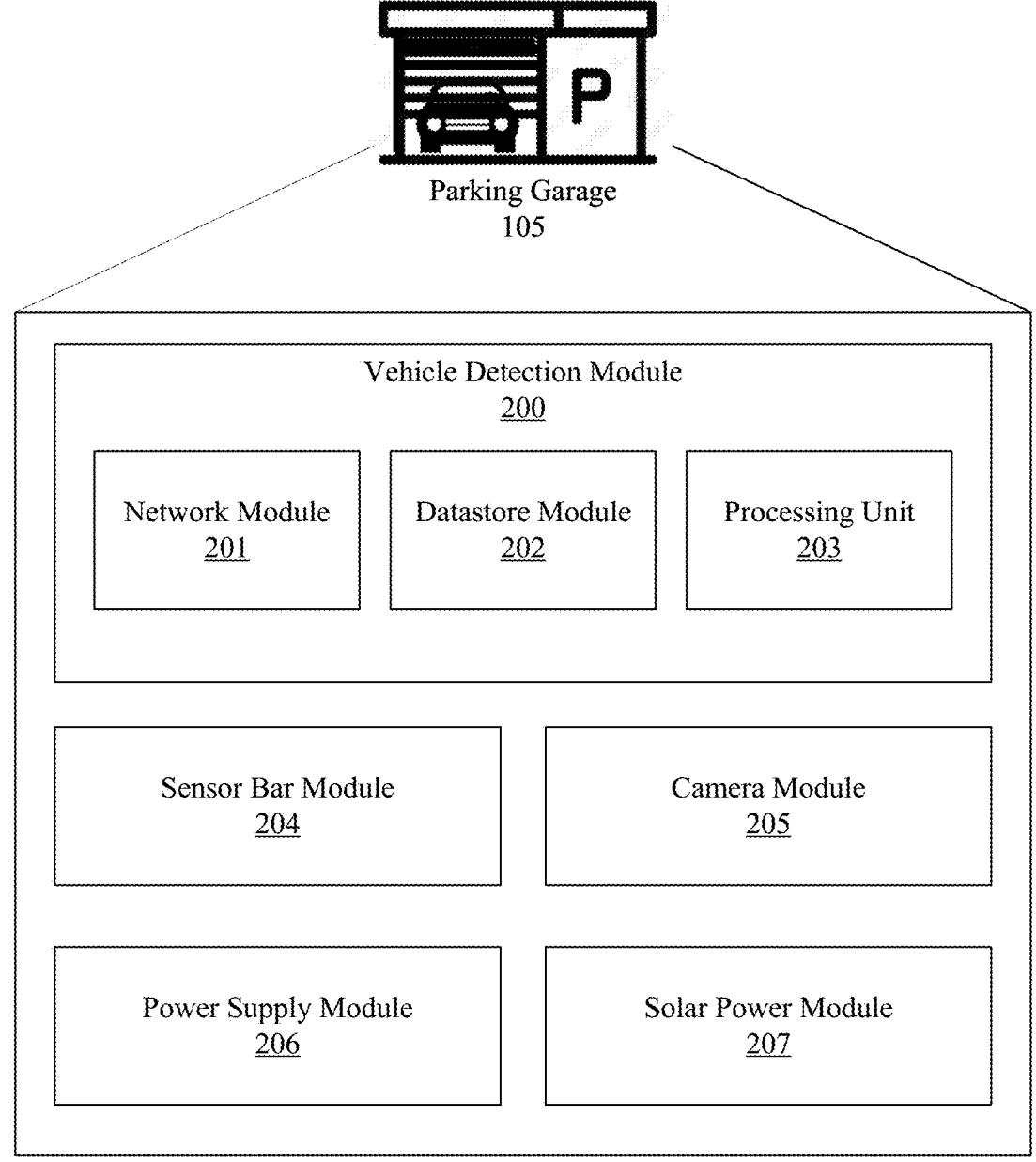
FIG. 2A is a diagram illustrating an exemplary parking facility in accordance with aspects of the present disclosure.

FIG. 2A is a diagram illustrating an exemplary parking facility 105 in accordance with aspects of the present disclosure. Parking facility 105 may vehicle detection module 200, sensor bar module 204, camera module 205, power supply module 206 and solar power module 207. Vehicle detection module 200 may further comprise network module 201, datastore module 202 and processing unit 203.

Network module 201 may transmit and receive data from other computing systems via a network such as network 130 as described above with regard to FIG. 1. In some embodiments, the network module 201 may enable transmitting and receiving data from the Internet. Data received by the network module 201 may be used by the other modules. The modules may transmit data through the network module 201.

The datastore module 202 may be configured to store information generated by the one or more modules operating at the parking facility 105. The one or more modules operating at the parking facility 105 may also retrieve information from the datastore module 202.

Processing unit 203 may be configured to receive data from the one or more sensor bar modules 204 and the one or more camera modules 205. Processing unit 203 may perform analysis on one or more images captured by camera module 205. The analysis may be used to identify a target vehicle image from a plurality of images. The target vehicle image may then be transferred to server 110 for vehicle recognition.

Sensor bar module 204 may be configured to detect a vehicle entering or exiting a parking facility. The sensor bar module 204 may control one or more pairs of sensors, process sensor data and send the data to the processing unit 203 for further processing or analysis.

Camera module 205 may be configured to capture images and/video of vehicles entering and exiting a parking facility. There may be a single camera for capturing entering vehicles and a single camera for capturing exiting vehicles. In some embodiments, there may be one or more cameras configured for capturing images entering vehicles and one or more cameras configured for capturing images of exiting vehicles. In some embodiments, the same camera or cameras may be used for capturing both entering and exiting vehicles.

Power supply module 206 may be configured to provide power to the processing unit 203, sensor bar modules 204 and camera module 205. Power supply module 206 may be connected to mains power or other power source and may include a battery backup.

Solar power module 207 may be configured to provide auxiliary power to the power supply module 206, processing unit 203, sensor bar modules 204 and camera module 205. Solar power module 207 may further be configured to charge a backup battery to provide power in the event of a power outage.

Figure 2B:
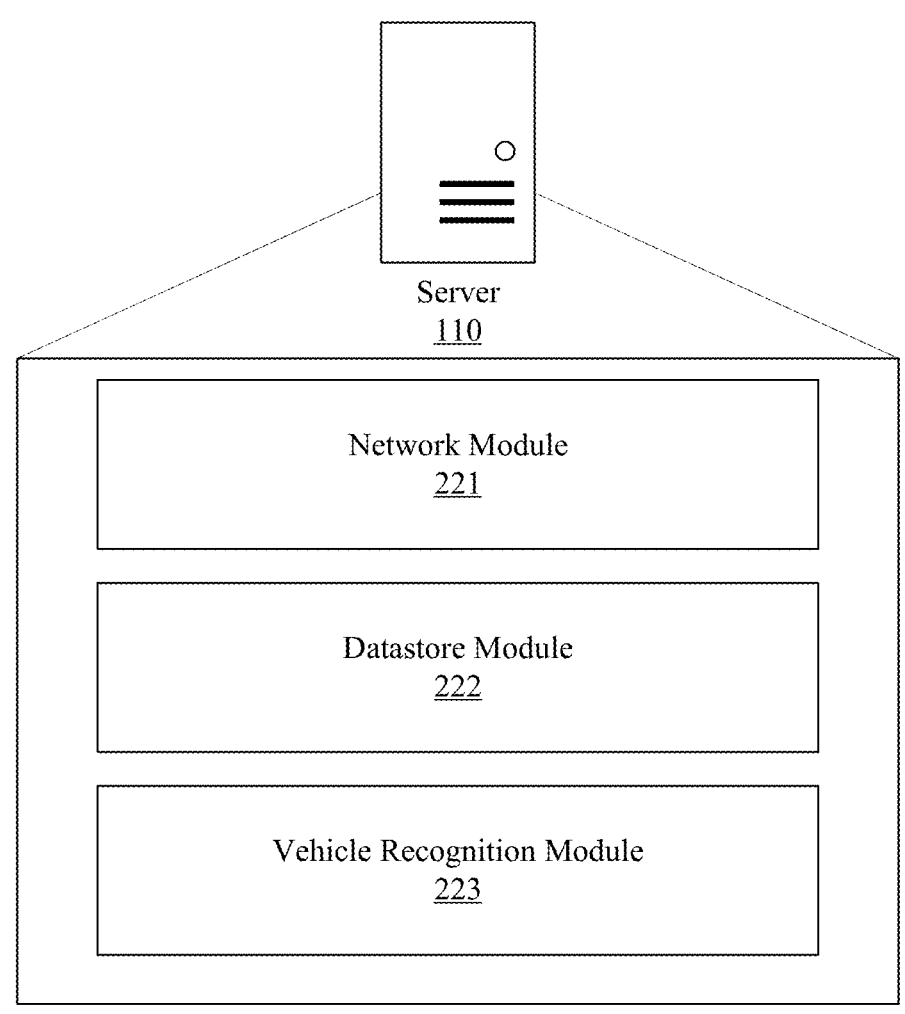
FIG. 2B is a diagram illustrating an exemplary server in accordance with aspects of the present disclosure.

FIG. 2B is a diagram illustrating an exemplary server 110 in accordance with aspects of the present disclosure. Server 110 may comprise network module 221, datastore module 222 and vehicle recognition module 223.

Network module 221, may be the same or similar to that of network module 201 in FIG. 2A and will not be described for the sake of brevity.

Datastore module 222 may be configured to store vehicle registration information, vehicle accounts, parking session information, vehicle recognition models, computer vision models and images captured by camera module 205.

Vehicle recognition module 223 may be configured to receive one or more images from camera module 205, identify a vehicle in the one or more images, extract a license plate number for each vehicle identified in the one or more images and match the identified vehicle with a vehicle account in datastore 222. A parking session may then be generated for the identified vehicle and the record stored for the account. In some embodiments, the vehicle recognition module may use a computer vision model or machine learning model to identify, track, label, recognize and categorize vehicles in images or video received from the camera module.

Figure 3A:
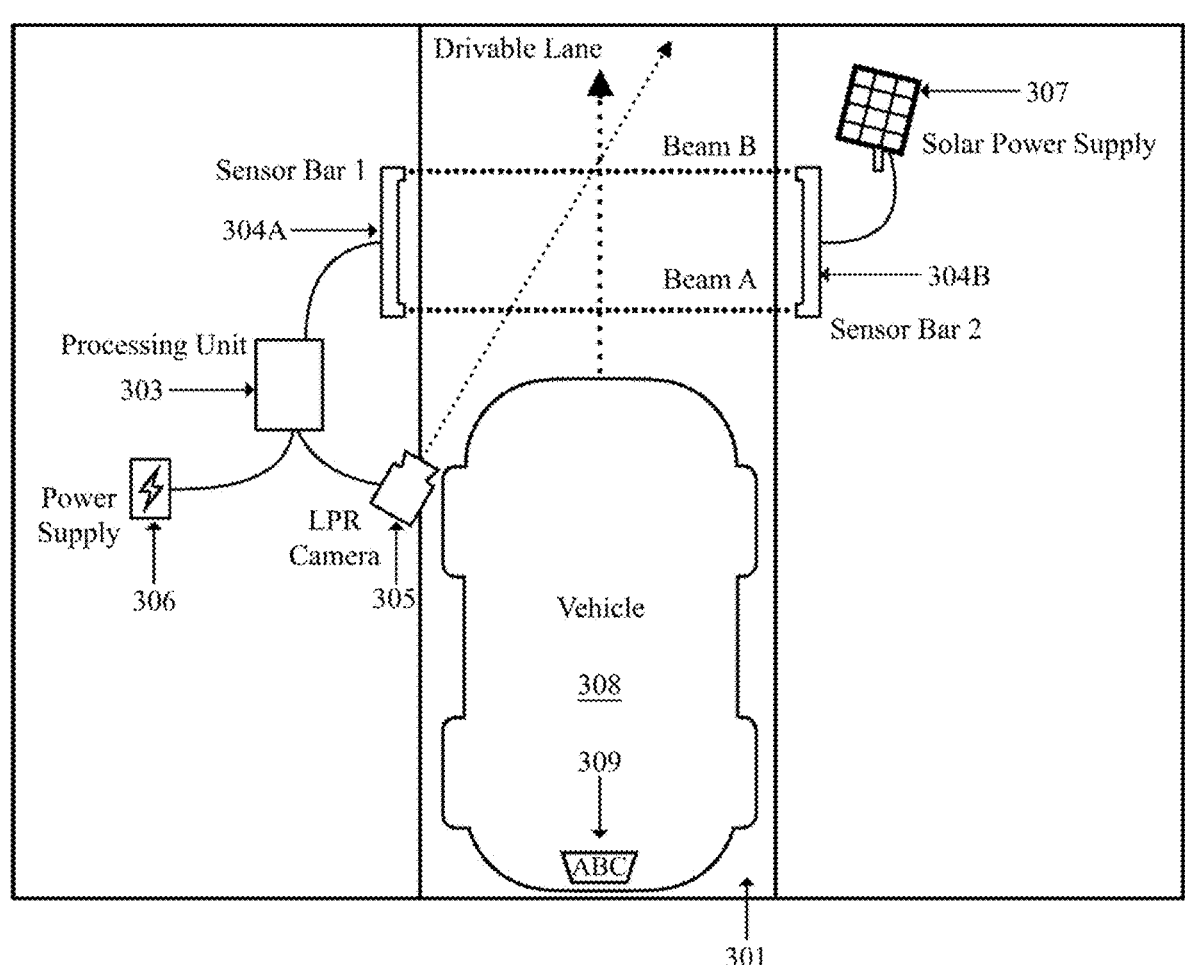
FIG. 3A is a diagram illustrating an exemplary vehicle detection system in accordance with some embodiments.

FIG. 3A is a diagram illustrating an exemplary vehicle detection system 300 in accordance with some embodiments. Vehicle detection system 300 may comprise a vehicle lane 301, processing unit 303, sensor bars 304A and 304B, camera 305, power supply 306 and solar power supply 307. Vehicle lane 301 may be an entry lane and/or an exit lane. The system may be configured to detect a vehicle traveling on the vehicle lane 301 as it enters or exits the parking facility. Detection of entry and exit may be based at least in part on sensor data generated by sensor bars 304A and 304B. In some embodiments, detection of entry and/or exit may be performed by image analysis alone if the sensor bars 304A and 304B are non-operational. Sensor data from sensor bars 304A and 304B may be used to determine a timestamp corresponding to a vehicle passing through a beam generated between the two sensor bars. In some embodiments, each sensor bar 304A and 304B may comprise two or more sensors configured to detect a vehicle. The sensors may be configured into pairs of sensors positioned on opposite sides of the vehicle lane. Each pair of sensors may further be positioned at a known distance from one another along the direction of travel of the vehicle lane 301. Each sensor pair may transmit a signal/beam from one to the other across the vehicle lane. A location of a vehicle may be determined based at least partly on the breaking of the beam being detected by the sensors. Each sensor pair may be configured to identify a timestamp corresponding when their beam was obstructed/broken, duration of obstruction and/or timestamp of reacquisition of the beam. The system may then determine a speed and length of the vehicle as it passes through the beams based on the identified timestamps (break/reacquire) and duration of each beam obstruction event. In some embodiments, more than two sensor pairs may be used to determine for vehicle detection. The determined speed and length of the vehicle may then be used to predict a vehicle path. The processing unit may then calculate a target position and target time to capture images of the vehicle. The target position and target time may be based at least in part on a view frustum of the camera 305 and the predicted path of the vehicle.

In some embodiments, the processing unit 303 may be configured to receive, from camera 305, images of the vehicle taken at the target time, and transmit them to the server for vehicle recognition. In some embodiments, a sampling window comprising a predetermined number of frames before and after the target time may be sampled by the processing unit 303 and analyzed or transferred to the server for analysis. The number of frames to be captured and/or sampled in the sampling window may be based on the determined or estimated speed of the vehicle and the position, orientation and view frustum of the camera 305. In some embodiments, the frame rate of the camera 305 and the resolution of the captured frames may be used, at least in part, in determining the sampling window. The frame rate and resolution may also be taken into consideration when determining the target time and target position.

In some embodiments, the image frame captured at the target time may be used for analysis and vehicle identification by the processing unit 303 or by the server 110. The system may also be configured to analyze the plurality of frames in the sampling window to determine the best frame to use for vehicle identification and license plate extraction. If the image frame captured at the target time is not usable or the analysis of that frame provides inaccurate or incomplete results, the system may select one or more additional frames from the sampling window to analyze. Multiple frames from the sampling window may be used to enhance or increase the resolution or clarity of the image frame captured at the target time. Using a super-resolution process, multiple images separated in time may be combined to produce an image of higher resolution. This super-resolution image may provide a better analysis result that is more accurate in reading the vehicle's license plate and extracting other identifying vehicle information.

In some embodiments, the selection of the frame to be analyzed and the size of the sampling window may be based at least in part on a time offset from a detection event at a pair of sensors. In some embodiments, the detection event may be a beam break ending corresponding to the last sensor pair in the direction of travel of the vehicle. A timestamp may be associated with the break beam ending event of the last sensor pair. The system may use the timestamp and the time offset to determine the target time. The image frame corresponding to the timestamp plus the time offset may be sampled/captured for analysis. The sampling window may be calculated with a buffer time, wherein the buffer time sets the amount of time (or number of frames) both before and after the target time to be captured/sampled. The start time of the sampling window may be calculated as timestamp+ time offset−buffer time, and the end time of the sampling window may be calculated as timestamp+time offset+buffer time. In some embodiments, the buffer time may be based on information received from the one or more sensor pairs, determined speed of the vehicle, length of the vehicle, acceleration of the vehicle or combination thereof.

In some embodiments power supply 306 may be configured as a primary power source for processing unit 303, sensor bars 304A and 304B and camera 305. In some embodiments, additional sources of power may be used as the primary power source for the processing unit 303, sensor bars 304A and 304B and camera 305, while power supply 306 and solar power supply may be used to supplement or provide redundancy in cases of power interruption.

In some embodiments, power supply 306 and solar power supply 307 may both be configured to provide power to one or more of the modules shown in FIG. 3A. Power supply 306 and solar power supply 307 may be physically/electrically connected to processing unit 303, sensor bars 304A and 304B and camera 305. The interconnectivity of the power supply 306 and solar power supply 307 may provide the system with the ability to selectively provide power to individual components of the system. The source of power to each individual component may be controlled and changed in real-time by the system.

Figure 3B:
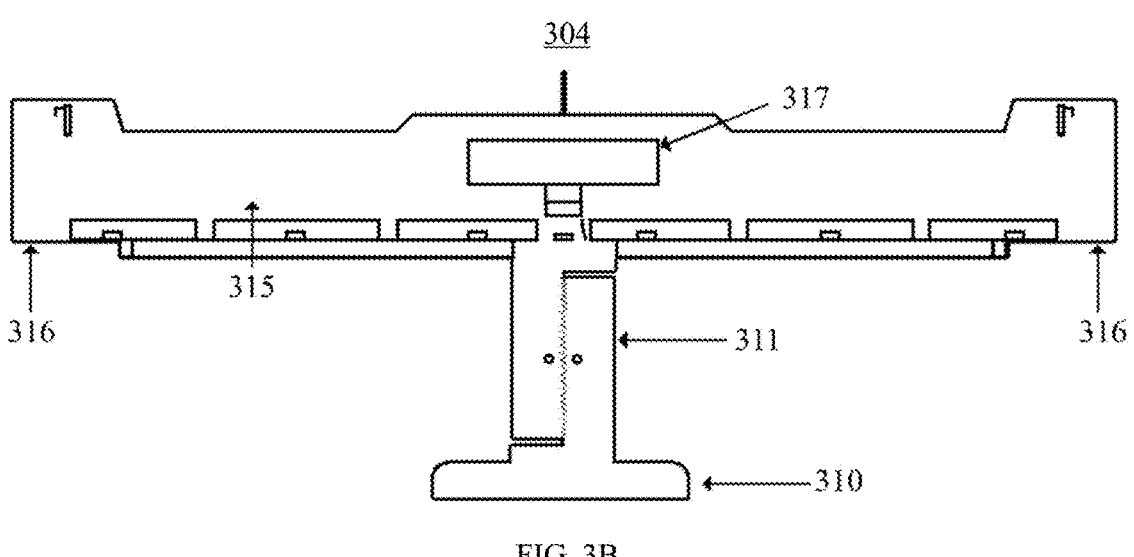
FIG. 3B is a diagram illustrating an exemplary sensor bar assembly in accordance with some embodiments.
Figure 3C:
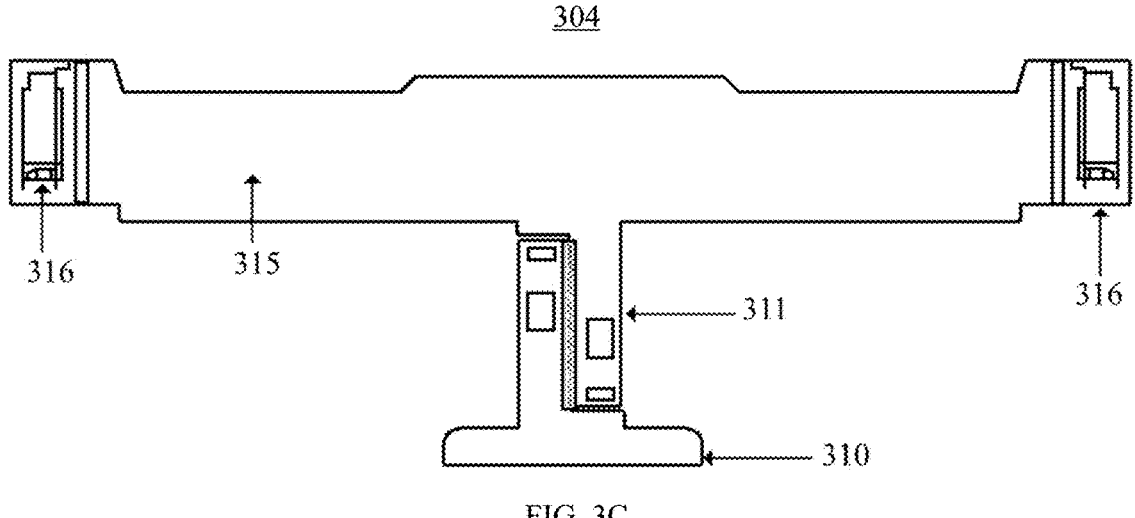
FIG. 3C is a diagram illustrating an exemplary sensor bar assembly in accordance with some embodiments.
Figure 3D:
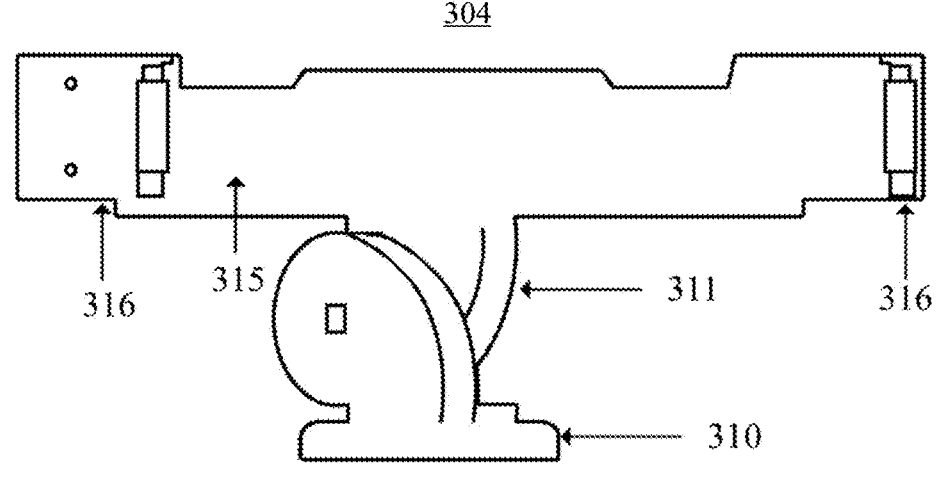
FIG. 3D is a diagram illustrating an exemplary sensor bar assembly in accordance with some embodiments.

FIGS. 3B-3D are diagrams illustrating an exemplary sensor bar assembly 304 in accordance with some embodiments. The sensor bar assembly 304 may comprise a base 310, base adjustment unit 311, a main body 315, sensor housing units 316 and sensor logic housing 317.

The base 310 may be rigidly attached to the ground, wall or other structure. Base adjustment unit 311 may be configured to allow for alignment of sensor across the vehicle lane 301. The sensor housing units may be configured to hold one sensor of a pair of sensors. Each sensor on a sensor bar assembly 304 may be from a different sensor pair. The corresponding sensor of the pair would be on a sensor bar assembly positioned on the opposing side of the vehicle lane.

Sensor logic housing 317 may be configured to hold one or more modules that may perform signal processing on data received from the sensors and transmit the data to the processing unit.

FIG. 4 is a flow chart illustrating an exemplary method 400 that may be performed in accordance with some embodiments.

At step 401, the system is configured to transmit, across a vehicle lane, a first beam between a pair of front vehicle sensing units.

At step 402, the system is configured to transmit, across a vehicle lane, a second beam between a pair of rear vehicle sensing units.

At step 403, the system is configured to detect a breaking of the first beam at a first time.

At step 404, the system is configured to detect a breaking of the second beam at a second time.

At step 405, the system is configured to determine that both the first beam and second beam are broken sequentially and concurrently remain broken for a predetermined amount of time.

At step 406, the system is configured to detect a reacquiring of the first beam, at a third time, wherein the reacquiring of the first beam occurs while the second beam is still broken.

At step 407, the system is configured to detect a reacquiring of the second beam, at a fourth time, wherein the reacquiring of the second beam occurs after the reacquiring of the of the first beam.

At step 408, the system is configured to determine a speed of the vehicle, wherein the speed of the vehicle is based at least partly on the first time, the second time, the third time, and the fourth time.

At step 409, the system is configured to determine the target capture time and the target capture location based on the fourth time, the determined speed of the vehicle, and a position of the first and second sensor bar modules.

At step 410, the system is configured to capture one or more first images of the vehicle at the determined target capture time and at the target capture location.

At step 411, the system is configured to analyze the one or more first images.

At step 412, the system is configured to extract the license plate number of the vehicle based on the analysis of the one or more first images.

At step 413, the system is configured to perform vehicle identification based on the one or more first images and the extracted license plate number.

Figure 5:
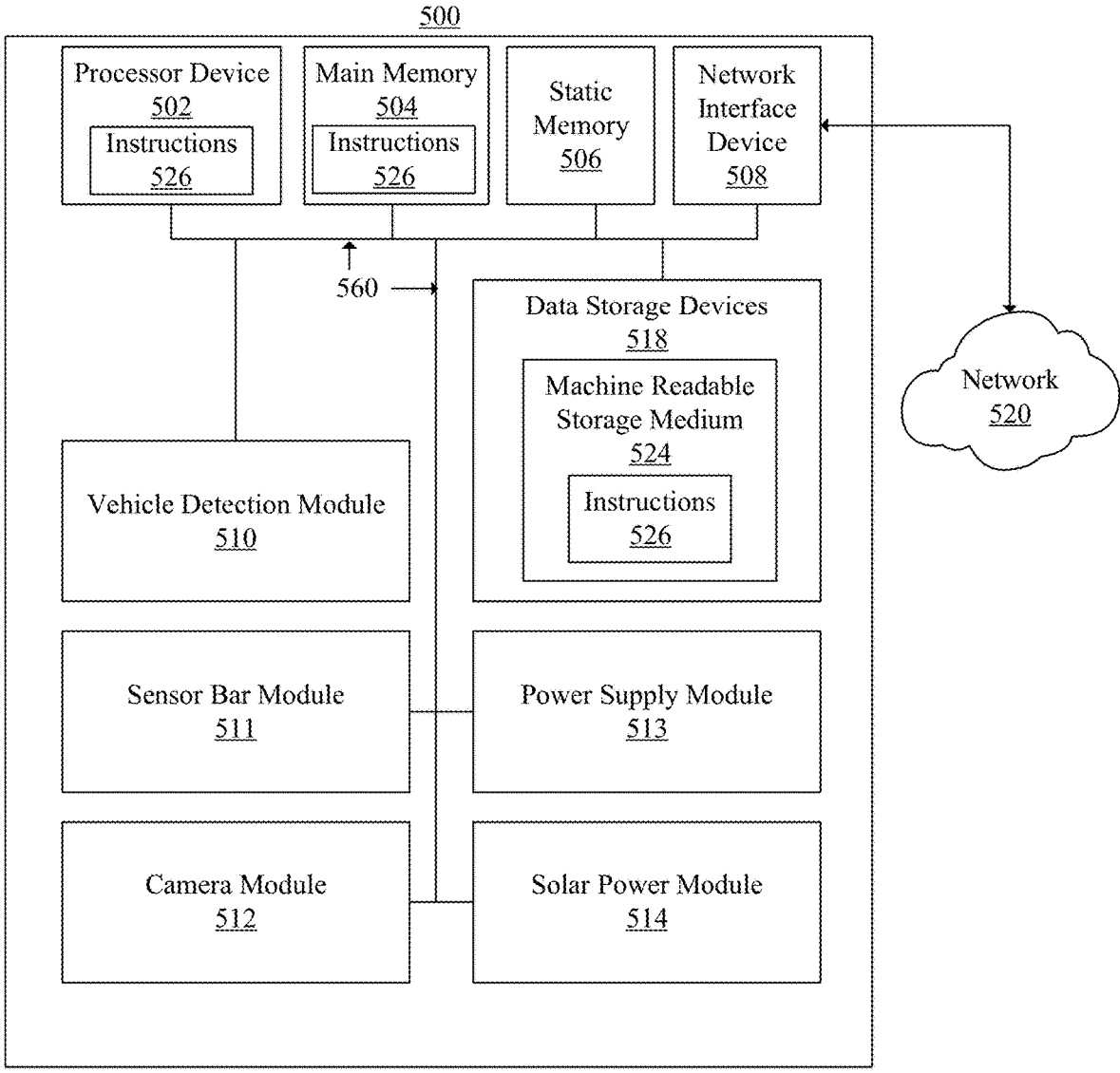
FIG. 5 is a diagram illustrating an exemplary computer/control system that may perform processing in some embodiments and in accordance with aspects of the present disclosure.

FIG. 5 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 560.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 708 to communicate over the network 520.

The computer system 500 also may include vehicle detection module 510, sensor bar module 511, camera module 512, power supply module 513 and solar power module 514. Vehicle detection module 510, sensor bar module 511, camera module 512, power supply module 513 and solar power module 514 may be the same or similar to that of vehicle detection module 200, sensor bar module 204, camera module 205, power supply module 206 and solar power module 207 as disclosed in FIG. 2A.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. Information, including data used in the processes and methods of the system and the one or more sets of instructions or software, may also be stored in blockchain, as NFTs or other decentralized technologies.

In one implementation, the instructions 526 include instructions to implement functionality corresponding to the components of a device to perform the disclosure herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1. A vehicle detection system for detecting a vehicle entering or exiting a parking facility, wherein the vehicle detection system comprises: a server; a datastore; and a vehicle detection unit, wherein the vehicle detection unit comprises: a processing module, comprising one or more processors; one or more sensor bar modules, wherein each of the one or more sensor bar modules comprises one or more vehicle sensing units; one or more power supply modules; and one or more camera modules, wherein the one or more camera modules are configured to capture one or more images of a vehicle at an target capture time and at an target capture location on a vehicle lane.

Example 2. The system of Example 1, wherein the one or more sensor bar modules comprise: a first sensor bar module and a second sensor bar module, wherein the first sensor bar module is positioned on a first side of the vehicle lane and the second sensor bar module is positioned on a second side of the vehicle lane; and wherein the first sensor bar module and the second sensor bar module are aligned with one another.

Example 3. The system of any one of Examples 1-2, wherein the first sensor bar module comprises a first front vehicle sensing unit and a first rear vehicle sensing unit; the second sensor bar module comprises a second front vehicle sensing unit and a second rear vehicle sensing unit; wherein the second front vehicle sensing unit is configured to transmit, across the vehicle lane, a first beam to the first front vehicle sensing unit; and wherein the second rear vehicle sensing unit is configured to transmit, across the vehicle lane, a second beam to the first rear vehicle sensing unit.

Example 4. The system of any one of Examples 1-3, wherein the vehicle detection unit is further configured to: determine that the vehicle has entered or exited the parking facility, wherein the determining comprises: detecting a breaking of the first beam at a first time; detecting a breaking of the second beam at a second time; determining that both the first beam and second beam are broken sequentially and concurrently remain broken for a predetermined amount of time; detecting a reacquiring of the first beam, at a third time, wherein the reacquiring of the first beam occurs while the second beam is still broken; and detecting a reacquiring of the second beam, at a fourth time, wherein the reacquiring of the second beam occurs after the reacquiring of the of the first beam; and identifying the vehicle, wherein the identifying the vehicle comprises: determining a speed of the vehicle, wherein the speed of the vehicle is based at least partly on the first time, the second time, the third time, and the fourth time; determining the target capture time and the target capture location based on the fourth time, the determined speed of the vehicle, and a position of the first and second sensor bar modules; capturing one or more first images of the vehicle at the determined target capture time and at the target capture location; analyzing the one or more first images; extracting a license plate number of the vehicle based on analysis of the one or more first images; and transmitting, to the server, the extracted license plate number.

Example 5. A computer-implemented method comprising: determining, by a vehicle detection unit, that a vehicle has entered or exited a parking facility, wherein the vehicle detection unit comprises: a processing module, comprising one or more processors; one or more sensor bar modules, wherein each of the one or more sensor bar modules comprises one or more vehicle sensing units; one or more power supply modules; and one or more camera modules, wherein the one or more camera modules are configured to capture one or more images of a vehicle at an target capture time and at an target capture location on a vehicle lane; identifying, by the vehicle detection unit, a license plate number of the vehicle; and transmitting, to a server, the license plate number.

Example 6. The method of Example 5, wherein the vehicle detection unit further comprises: a first sensor bar module and a second sensor bar module, wherein the first sensor bar module is positioned on a first side of the vehicle lane and the second sensor bar module is positioned on a second side of the vehicle lane; and wherein the first sensor bar module and the second sensor bar module are aligned with one another.

Example 7. The method of Examples 5-6, wherein the first sensor bar module comprises a first front vehicle sensing unit and a first rear vehicle sensing unit; the second sensor bar module comprises a second front vehicle sensing unit and a second rear vehicle sensing unit; wherein the second front vehicle sensing unit is configured to transmit, across the vehicle lane, a first beam to the first front vehicle sensing unit; and wherein the second rear vehicle sensing unit is configured to transmit, across the vehicle lane, a second beam to the first rear vehicle sensing unit.

Example 8. The method of Examples 5-7, wherein the determining that the vehicle has entered or exited the parking facility further comprises: detecting a breaking of the first beam at a first time; detecting a breaking of the second beam at a second time; determining that both the first beam and second beam are broken sequentially and concurrently remain broken for a predetermined amount of time; detecting a reacquiring of the first beam, at a third time, wherein the reacquiring of the first beam occurs while the second beam is still broken; and detecting a reacquiring of the second beam, at a fourth time, wherein the reacquiring of the second beam occurs after the reacquiring of the of the first beam.

Example 9. The method of Examples 5-8, wherein the identifying the license plate number of the vehicle further comprises: determining a speed of the vehicle, wherein the speed of the vehicle is based at least partly on the first time, the second time, the third time, and the fourth time; determining the target capture time and the target capture location based on the fourth time, the determined speed of the vehicle, and a position of the first and second sensor bar modules; capturing one or more first images of the vehicle at the determined target capture time and at the target capture location; analyzing the one or more first images; and extracting the license plate number of the vehicle based on the analysis of the one or more first images.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A vehicle detection system for detecting a vehicle, the system comprises:

a first vehicle sensing unit comprising a sensor used to determine a presence of a vehicle at a first location;

a second vehicle sensing unit comprising a sensor used to determine a presence of the vehicle at a second location;

a camera module, comprising a single camera, wherein the camera module is located at a fixed position relative to the first vehicle sensing unit, and wherein the camera module is configured to capture a first set of multiple images depicting the vehicle as the vehicle passes the first vehicle sensing unit and the second vehicle sensing unit in a first direction of travel; and a processing module, comprising one or more processors, wherein the one or more processors are configured to:

after the vehicle passes the first sensing unit and the second sensing unit in the first direction of travel, then:

determine a direction of travel of the vehicle through the first location and the second location; and select based on the determined direction of travel, a plurality of the first set of multiple images that were captured by the camera;

use a vehicle recognition module and analyze the selected plurality of the multiple images and identify a vehicle that is present in an image; and determine if the identified vehicle matches a vehicle associated with a parking session.

2. The vehicle detection system of claim 1, further comprising:

a first sensor bar module comprising:

a first base, wherein the base is attached to a ground or a structure; and a main body attached to the first base;

wherein the first vehicle sensing unit is attached to the main body.

3. The vehicle detection system of claim 2, further comprising:
a second sensor bar module comprising:
a second base; and
a main body attached to the body;
wherein the second vehicle sensing unit is attached to the main body of the second sensor bar module.

4. The vehicle detection unit of claim 3, wherein the first sensor bar module is positioned on a first side of a vehicle lane, and wherein the second sensor bar module is positioned on a second side of the vehicle lane.

5. The vehicle detection system of claim 2, wherein the one or more processors are further configured to:
use the first set of multiple images to determine when the vehicle entered a parking facility; and
use second set of multiple images to determine when the vehicle exited the parking facility, wherein the camera is configured to capture the first set of multiple images and the second set of multiple images at a predetermined frame rate.

6. The vehicle detecting system of claim 1, wherein the one or more processors are further configured to:
detect the presence of the vehicle by the first vehicle sensing unit at a first time;
detect the presence of the vehicle by the second vehicle sensing unit at a second time;
determine a first timestamp when the first vehicle sensing unit detected the presence of the vehicle;
determine a second timestamp when the second vehicle sensing unit detected the presence of the vehicle; and
based on the determined first timestamp, the determined second time stamp, and the determined direction of travel, select the plurality of the multiple images.

7. The vehicle detecting system of claim 6, wherein the one or more processors are further configured to:
recognize the vehicle by performing a vehicle recognition process using the plurality of the multiple images that were captured by the camera; and
generate for the recognized vehicle an entry timestamp and exit timestamp.

8. The vehicle detection system of claim 6, wherein the one or more processors further configured to:
determine a length of the vehicle; and
calculate a speed of the vehicle based on the determined length of the vehicle.

9. The vehicle detection system of claim 6,
wherein the camera module is configured to capture a second set of multiple images depicting the vehicle as the vehicle passes the first vehicle sensing unit and/or the second vehicle sensing unit in a second direction of travel, and wherein the one or more processors are configured to:
after the vehicle passes the first sensing unit and the second sensing unit in the second direction of travel, then:
determine a direction of travel of the vehicle through the first location and the second location;
select based on the determined direction of travel, a plurality of the second set of multiple images that were captured by the camera; and
determine a time when the vehicle has entered or exited a parking facility.

10. The vehicle detection system of claim 6, the one or more processors further configured to:

determine a speed of the vehicle based on the travel of the vehicle passed the first vehicle sensing unit and the second vehicle sensing unit; and
select, based on the determined speed of the vehicle, the plurality of the images that were captured by the camera depicting the vehicle.

11. A method for detecting a vehicle, the method comprising:
capturing multiple images by a vehicle detection system comprising:
a first vehicle sensing unit, wherein the first vehicle sensing unit comprising a sensor to determine a presence of a vehicle at a first location; and
a second vehicle sensing unit, wherein the second vehicle sensing unit comprising a sensor to determine a presence of the vehicle at a second location; and
a camera module comprising a single camera, wherein the camera module is located at a fixed position relative to the first vehicle sensing unit;
wherein the multiple images are captured, via the single camera, as the vehicle passes the first vehicle sensing unit and/or the second vehicle sensing unit;
after the vehicle passes the first sensing unit and the second sensing unit in a first direction of travel, then:
determining a direction of travel of the vehicle through the first location and the second location;
selecting based on the determined direction of travel, a plurality of the multiple images that were captured by the camera;
use a vehicle recognition module and analyze the selected plurality of the multiple images and identify a vehicle that is present in an image; and
determine if the identified vehicle matches a vehicle associated with a parking session.

12. The method of claim 11, wherein the vehicle detection system further comprises:
a first sensor bar module comprising:
a first base, wherein the first base is attached to a ground or a structure; and
a main body attached to the first base;
wherein the first vehicle sensing unit is attached to the main body.

13. The method of claim 12, wherein the vehicle detection system further comprises:
a second sensor bar module comprising:
a second base; and
a main body attached to the second base;
wherein the second vehicle sensing unit is attached to the main body of the second sensor bar module.

14. The method of claim 13, wherein the first sensor bar module is positioned on a first side of a vehicle lane, and wherein the second sensor bar module is positioned on a second side of the vehicle lane.

15. The method of claim 12, further comprising:
using the first set of multiple images to determine when the vehicle entered a parking facility; and
using a second set of multiple images to determine when the vehicle exited the parking facility, wherein the single camera is configured to capture the first set of multiple images and the second set of multiple images at a predetermined frame rate.

16. The method of claim 11, further comprising:
detecting the presence of the vehicle by the first vehicle sensing unit at a first time;
detecting the presence of the vehicle by the second vehicle sensing unit at a second time;

determining a first timestamp when the first vehicle sensing unit detected the presence of the vehicle;

determining a second timestamp when the second sensing unit detected the presence of the vehicle; and based on the determined first timestamp, the determined second time stamp, and the determined direction of travel, selecting the plurality of the multiple images.

17. The method of claim 16, further comprising:

recognizing the vehicle by performing a vehicle recognition process using the plurality of the multiple images that were captured by the camera; and generating for the recognized vehicle an entry timestamp and exit timestamp.

18. The method of claim 16, further comprising:

determining a length of the vehicle; and calculating a speed of the vehicle based on the determined length of the vehicle.

19. The method of claim 16, further comprising:

wherein the camera module is configured to capture a second set of multiple images depicting the vehicle as the vehicle passes the first vehicle sensing unit and/or the second vehicle sensing unit in a second direction of travel, and wherein the one or more processors are configured to:

after the vehicle passes the first sensing unit and the second sensing unit in the second direction of travel, then:

determining a direction of travel of the vehicle through the first location and the second location; and selecting based on the determined direction of travel, a plurality of the second set of multiple images that were captured by the camera; and determining a time when the vehicle has entered or exited a parking facility.

20. The method of claim 16, further comprising:

determining a speed of the vehicle based on the travel of the vehicle passed the first vehicle sensing unit and the second vehicle sensing unit; and selecting, based on the determined speed of the vehicle, the plurality of the images that were captured by the camera depicting the vehicle.

21. The vehicle detection system of claim 1, wherein the camera module comprises another one or more single cameras, and the another one or more single cameras are configured to capture images of entering or exiting vehicles.

22. The vehicle detection system of claim 21, further comprising:

one or more additional camera modules, wherein the one or more additional camera modules are configured to capture images of entering or exiting vehicles.

23. The method of claim 22, wherein the camera module comprises another one or more single cameras, and the another one or more single cameras are configured to capture images of entering or exiting vehicles.

24. The method of claim 23, further comprising:

one or more additional camera modules, wherein the one or more additional camera modules are configured to capture images of entering or exiting vehicles.

\*   \*   \*   \*   \*